United States Patent [19]

Glomski

[11] 4,029,359

[45] June 14, 1977

[54] SAFETY APPARATUS FOR HYDRAULIC VALVES IN DUMP BODY MECHANISMS

[75] Inventor: Norman J. Glomski, Milwaukee, Wis.

[73] Assignee: The Heil Co., Milwaukee, Wis.

[22] Filed: Apr. 30, 1975

[21] Appl. No.: 572,989

[52] U.S. Cl. .......................... 298/22 C; 91/358 R; 91/387; 91/454; 298/22 F
[51] Int. Cl.² ........................................... B60P 1/16
[58] Field of Search ............ 298/22 R, 22 C, 22 F; 91/358 R, 358 A, 383, 387, 410, 449, 454; 137/596.12, 102

[56] References Cited

UNITED STATES PATENTS

| | | | |
|---|---|---|---|
| 2,811,016 | 10/1967 | McRae | 91/449 X |
| 3,017,862 | 1/1962 | Freist | 91/387 X |
| 3,128,677 | 4/1964 | Tennis | 91/383 |
| 3,534,679 | 10/1970 | Forichon | 91/358 R |

Primary Examiner—Irwin C. Cohen
Attorney, Agent, or Firm—Wheeler, Morsell, House & Fuller

[57] ABSTRACT

A cable is connected between the dump body of a dump truck and the movable control member of an hydraulic valve to automatically shift the valve from its "raise" position to its "neutral" position when the dump body approaches its uppermost raised position. There is means to prevent inadvertent transmission of forces from the cable to the movable control member to thereby prevent accidental lowering of the dump body due to an inadvertent pull on the cable.

9 Claims, 4 Drawing Figures

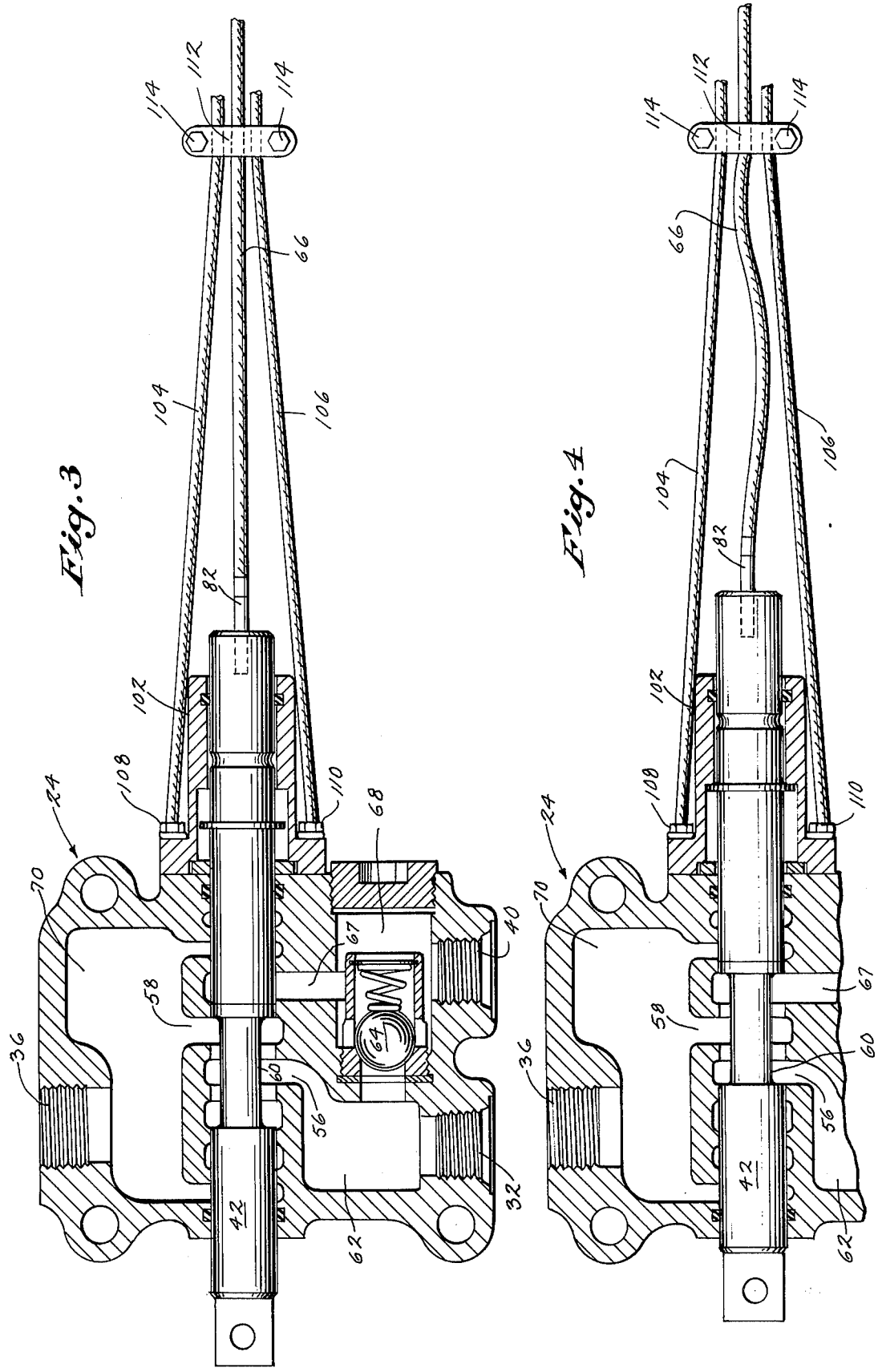

2

SAFETY APPARATUS FOR HYDRAULIC VALVES IN DUMP BODY MECHANISMS

BACKGROUND OF THE INVENTION

In conventional dump trucks, raising of the dump body is initiated by a manually movable lever which is connected to the spool of the hydraulic valve. When the spool is moved from its neutral position to its raise position, hydraulic fluid is pumped into the hydraulic cylinder to raise the dump body. As the dump body approaches its uppermost position, it exerts a pull on a cable connected between the dump body and the valve spool to shift the valve from its raise position back to its neutral position and automatically terminate raising of the dump body.

The dump body remains locked in its raised position until the valve spool is shifted from its neutral position to its "lower" position at which time the dump body begins lowering and continues lowering as long as the valve spool remains in its lower position, until the dump body has been fully lowered. Lowering of the dump body is normally initiated by manually moving the control lever, but in arrangements as heretofore used lowering can also be inadvertently initiated if someone or something bumps into the cable which is connected between the dump body and the valve spool. The force applied to the cable moves the spool from its neutral position to its lower position and initiates lowering of the dump body. Moreover, after the dump body begins to lower, it will continue its downward travel even if the pressure on the cable is released. To stop the lowering action, the operator must go to the control lever, which is usually mounted in the cab, and manually move the control lever to its neutral position. Therefore, if the lowering action is inadvertently initiated by a person working under the raised dump body, there is an undesirable situation, since he has no way, within reach, of stopping the lowering action.

In the past, an attempt has been made to eliminate the above noted danger by use of a rigid sheath to protect most of the exposed portion of the cable from inadvertent contact. However, a short length of the cable adjacent its connection with the dump body must be exposed, so that the danger still exists for a person working around the rear of the dump body adjacent to said exposed portion.

SUMMARY OF THE INVENTION

In accordance with this invention, the above noted danger is eliminated by stop means which prevents inadvertent transmission of forces from the cable to the movable control member when the latter is in its neutral position to prevent accidental lowering of the dump body. In one embodiment of the invention, the stop means comprises a pair of short cables connected between the body of the hydraulic valve and the main cable. In another embodiment of the invention, the stop means comprises a slide member mounted for axial movement relative to the spool, there being cooperable stop means on the slide and valve housing preventing movement of the slide in response to an inadvertent pull on the cable when the valve spool is in neutral position.

DESCRIPTION OF THE DRAWINGS

FIG. 3 is a longitudinal sectional view of the hydraulic valve illustrating a modified form of the invention, the valve spool being in its neutral position.

FIG. 4 is a fragmentary longitudinal sectional view of the form of the invention of FIG. 3 showing the valve spool in its lower position.

DESCRIPTION OF THE PREFERRED EMBODIMENTS

Figure 1:
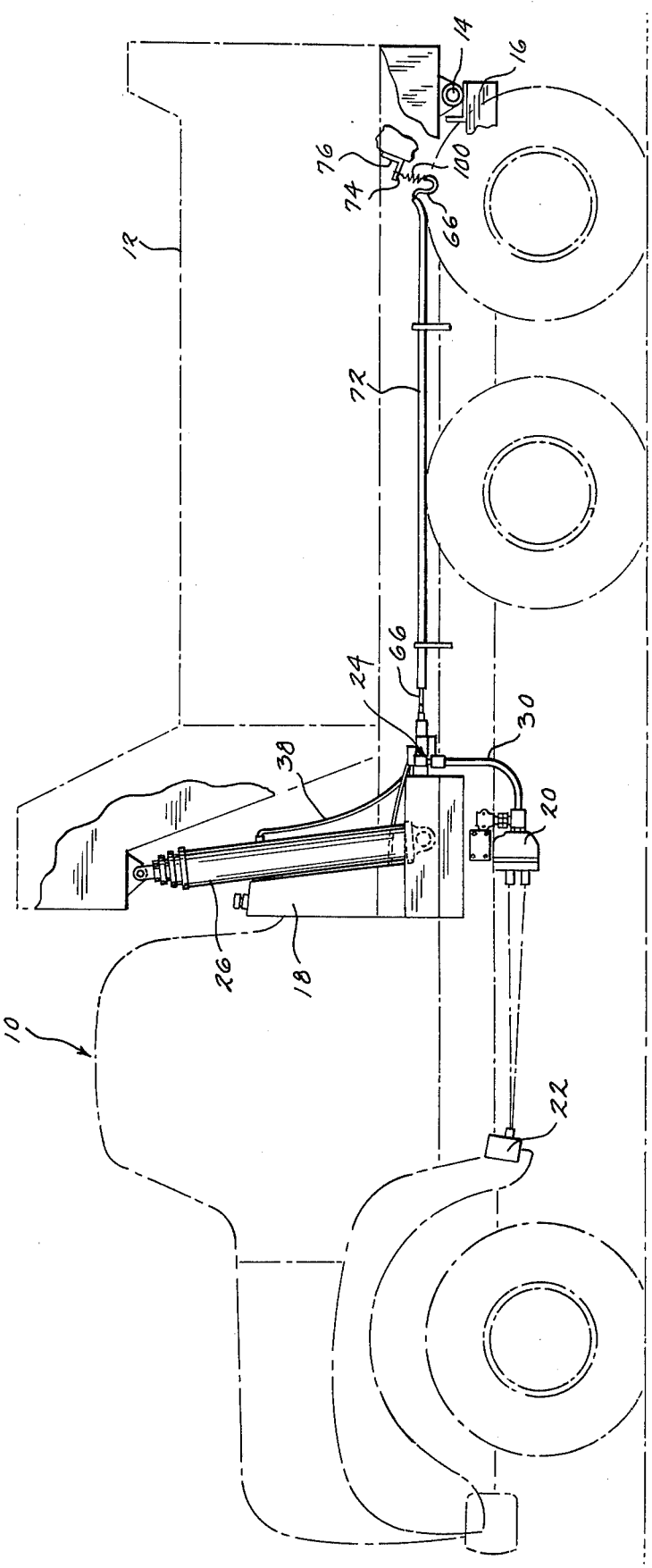
FIG. 1 is a partially diagrammatic side elevational view of a dump truck with the components of the hydraulic system and parts of the dump body shown in solid lines.

FIG. 1 shows a conventional dump truck 10 with a tiltable dump body 12 which is pivotally connected as at 14 to the dump truck frame 16.

Figure 2:
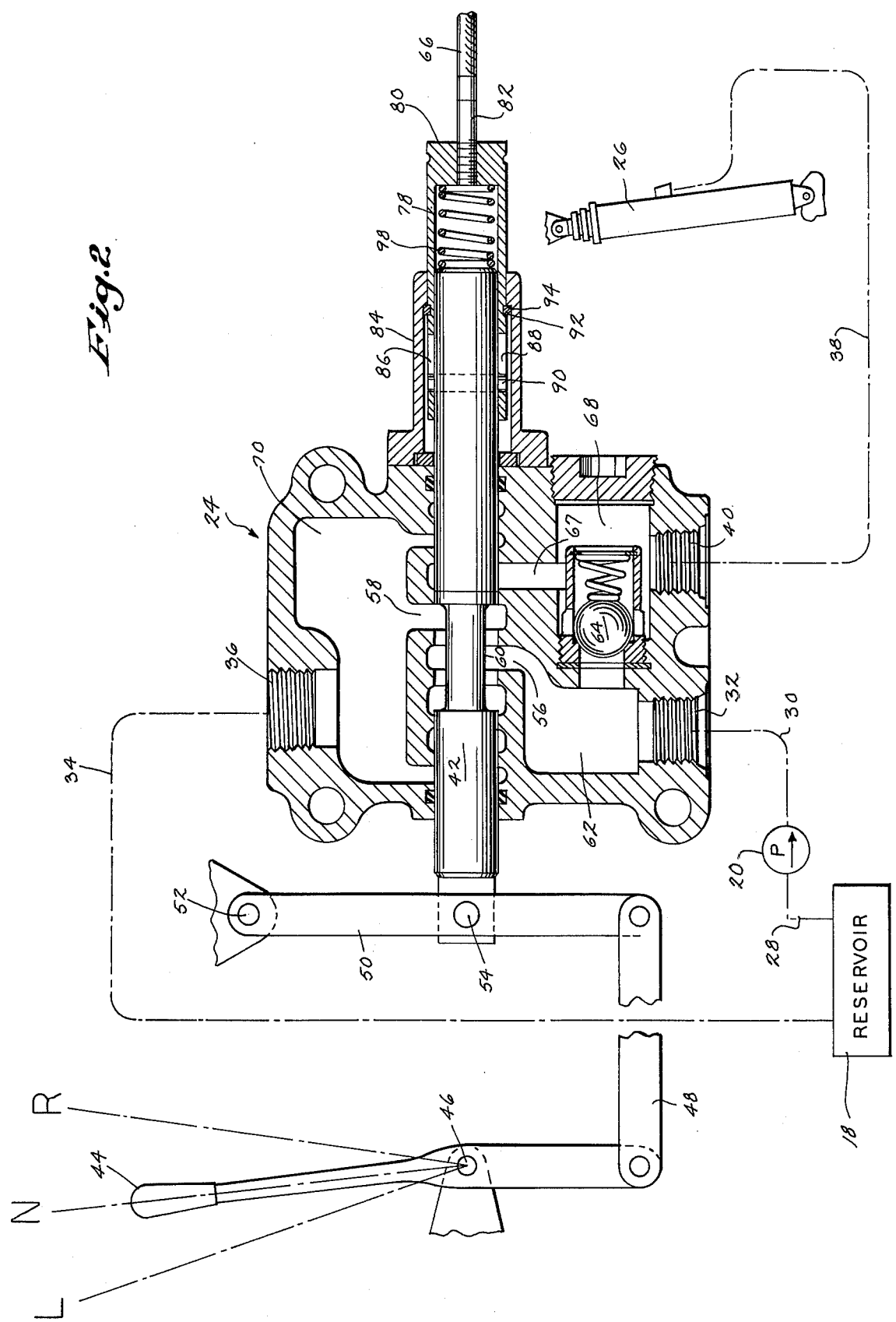
FIG. 2 is a diagrammatic side elevational view of the hydraulic system, the hydraulic valve being shown in longitudinal section, the view illustrating one form of the invention.

The hydraulic system for dump body 12 includes a hydraulic reservoir 18 (FIG. 2), a hydraulic pump 20 which is driven by a power take off 22, a hydraulic valve 24, a telescopic hydraulic cylinder 26, and suitable hoses and piping coupling the hydraulic components together as shown in FIG. 2. The hoses include a hose 28 coupling the inlet of pump 20 to reservoir 18, a hose 30 coupling the outlet of pump 20 to inlet port 32 of valve 24, a return hose 34 coupling outlet port 36 of valve 24 to reservoir 18, and piping 38 coupling port 40 of valve 24 to hydraulic cylinder 26.

Hydraulic valve 24 includes a valve control member or spool 42 which is slidable within a bore in the housing of valve 4, and which projects beyond the left side of valve 24 (FIG. 2) for connection to a manual control lever 44 (located in the cab of the truck) which is adapted to shift the spool 42 from a neutral (N) position to a raise (R) position or a lower (L) position. Manual control lever 44 is pivotally connected to the truck frame at 46 and is connected to the valve spool 42 through linkage 48 and a lever 50, the latter being pivotally connected to the truck frame at 52 and to the valve spool 42 at 54.

When manual control lever 44 and valve spool 42 are in their neutral (N) position as shown in FIG. 2, and when pump 20 is being driven by power take off 22, then hydraulic fluid enters valve 24 at port 32 and flows from internal port 56 to internal port 58 via an annular recess 60 in the valve spool 42. It then flows from port 58 to outlet port 36, and from there back to reservoir 18. In the neutral (N) condition, there is no appreciable resistance to the flow of hydraulic fluid through valve 24, and hydraulic cylinder 26 is bypassed.

When manual control lever 44 and valve control member 42 are moved to their raise (R) position, the full diameter portion of valve spool 42 which is at the right of reduced diameter portion 60 (FIG. 2) is shifted to the left to block flow to port 58. This blocks the flow of hydraulic fluid through valve 24 and causes a build up of pressure in inlet chamber 62. The pressure build up forces hydraulic fluid past a ball check valve 64, and from there out of port 40 to hydraulic cylinder 26. This extends the telescopic cylinder 26 and causes dump body 12 to raise.

As dump body 12 approaches its uppermost position, it exerts a pull on a flexible steel cable 66 (FIG. 1) which has one end connected through sleeve 78 to the right hand side of valve spool 42 (FIG. 2). The pull on cable 66 automatically shifts valve spool 42 from its raise (R) position back to its neutral (N) position and terminates the raising action by bypassing the hydraulic fluid through the valve via ports 56 and 58 and recess 60 as explained previously in connection with the neutral (N) position. Check valve 64 locks hydraulic cylinder 26 in its fully extended or raised position as long as valve spool 42 remains in its neutral (N) position.

To lower dump body 12, manual control lever 44 and valve spool 2 are moved from their neutral (N) position to their lower (L) position, which shifts valve spool 42 to the right in FIG. 2 until the reduced diameter portion 60 of spool 42 overlaps port 67, permitting hydraulic fluid to return from chamber 68 through port 67, reduced portion 60, and port 58 to chamber 70, and from chamber 70 through outlet port 36 back to reservoir 18. This allows retraction of cylinder 26 to permit lowering of the dump body 12 by gravity. As hydraulic cylinder 26 is retracting, the hydraulic fluid pumped into valve chamber 62 is bypassed through port 56, reduced diameter portion 60, and port 58 back to the reservoir.

This invention is concerned with preventing accidental lowering of a raised dump body 12 due to an accidental pull on cable 66 while valve spool 42 is in its neutral (N) position. As shown in FIG. 1, accidental contact with cable 66 is partially prevented by a rigid sheath 72 which covers the most of the length of cable 66. However, it is not possible to fully cover cable 66 because its right hand end portion must be exposed near its point of connection 74 with dump body 12 at bracket 76. This exposure is necessary to permit dump body 12 to be raised and also to permit slack to form in cable 66 when dump body 12 is in its lowermost position. Therefore, prior to the present invention is has been possible for a workman to accidentally bump this exposed portion of cable 66, when dump body 12 is in its raised position, and to accidentally pull valve spool 42 from its neutral (N) position to its lower (L) position, thus inadvertently lowering dump body 12. To obviate this danger, this invention provides stop means which prevents inadvertent transmission of force from cable 66 to valve spool 42 when the latter is in its neutral (N) position.

Referring to FIG. 2, in one embodiment of the invention the stop means includes a slide member in the form of a sleeve 78 which is attached at its closed end 80 to cable 66 via a threaded connecting stud 82. Sleeve 78 is slideable relative to the end of valve spool 42 and within the interior of a hollow hub 84 projecting from the body of valve 24. Diametrically opposed longitudinal slots 86 and 88 are cut in sleeve 78 and receive the opposite ends of a pin 90 that extends transversely through valve spool 42. Slots 86 and 88 and cooperating pin 90 form a lost motion connection between sleeve 78 and valve spool 42. A stop ring 92 is seated in a circumferential groove in sleeve 78 to the right of slots 86 and 88. This ring is adapted to abut a shoulder 94 near the end of hub 84 when valve spool 42 is in its neutral (N) position. Therefore, when an inadvertent force is applied to cable 66, the pull is transmitted to stop ring 92 and shoulder 94 and no movement of valve spool 42 occurs. Thus accidental bumping against cable 66 cannot cause lowering of dump body 12.

However, dump body 12 can be deliberately lowered if desired by moving manual control lever 44 to its lower (L) position, which moves valve spool 42 to the right in FIG. 2, causing pin 90 to move to the right in slots 86 and 88 and compressing a spring 98 between the ends of valve spool 42 and sleeve 78. When manual control lever 44 is released, spring 98 automatically returns valve spool 42 and control lever 44 to their neutral (N) position. This is an important safety feature, since if someone should be caught under the dump body 12 while it is being lowered, his shout would be heard by the operator in the cab, and the operator's first reaction would probably be to release his grip on control lever 44 preparatory to moving it from the lower (L) position to the neutral (N) position. However, due to the compression of spring 98, shifting to the neutral (N) position would, with this invention, be automatic, thus arresting the lowering of dump body 12 in less time than would be required in a completely manually operated system.

When valve spool 42 is shifted from its neutral (N) position to its raise (R) position to raise dump body 12, pin 90 engages the left hand end of slots 86 and 88 in FIG. 2 and pulls sleeve 78 and cable 66 to the left in FIG. 2. This displaces stop ring 92 to the left of shoulder 94 in FIG. 2 by a distance which is great enough to permit valve spool 42 to be pulled back to its neutral (N) position by cable 66 when dump body 12 reaches its uppermost position and pulls on cable 66. Thus, the stop means of this invention permits a force to be transmitted from cable 66 to valve spool 42 when the latter is in its raise (R) position, but not when it is in its neutral (N) position, thereby permitting cable 66 to perform its automatic shut off function without any danger of accidental lowering if cable 66 is inadvertently bumped.

As shown in FIG. 1, an expansion spring 100 is preferably connected between the end of cable 66 and the bracket 76 of dump body 12 to which it is attached to minimize the force applied between stop ring 92 and shoulder 94 when cable 66 is in its fully extended position. If cable 66 is pulled in its fully extended position, either by tilting of truck body 12 or by an accidental bump, the pull will expand spring 100 instead of generating a large force between stop ring 92 and shoulder 94.

FIGS. 3 and 4 show another embodiment of the invention which can be employed without any internal alterations of the valve as heretofore used. In this embodiment the hub 102, which projects from the body of valve 24, slideably encloses the right hand portion of valve spool 42 (FIGS. 3 and 4). Cable 66 is attached by threaded stud 82 directly to the right hand end of valve spool 42. This type of arrangement, as heretofore used, was vulnerable to accidental lowering of dump body 12 due to an inadvertent pull on or bump against cable 66 when valve spool 42 was in its neutral (N) position. To eliminate this hazard in the form of FIGS. 3 and 4, two short flexible steel cables 104 and 106 are connected between the housing of valve 24 and cable 66 by means of bolts 108 and 110 and a three cable clamp 112 which is fastened together by bolts 114. Clamp 112 is adjusted so that cables 104 and 106 are taut when valve spool 42 is in its neutral position, as in FIG. 3. This prevents an accidental force on cable 66 from being transmitted to valve spool 42 when the valve is in its neutral position and causes such force to be transmitted to bolts 108 and 110 instead.

When valve spool 42 is shifted from its neutral position shown in FIG. 3 to its lower position shown in FIG. 4, the end of cable 66 buckles as shown in FIG. 4 to permit the movement. As dump body 12 lowers, slack is created in all three cables 66, 104 and 106, which permits valve spool 42 to be subsequently moved to the left, in FIG. 3, to its raise position when port 58 is closed by the large diameter portion of valve spool 42. Thus the cables 104 and 106 prevent force from being transmitted from cable 66 to valve spool 42 when it is in its neutral position. In the form of invention of FIG. 3, this is accomplished without otherwise altering valve 24. Thus the arrangement of FIG. 3 may be installed on trucks already in the field to eliminate the hazards heretofore discussed.

While the present invention has been illustrated and described as particularly adapted for use in connection with dump trucks, it is obvious that it has utility in any dump body mechanism including stationary equipment.

Various changes and modifications may be made without departing from the spirit of the invention, and all of such changes are contemplated as may come within the scope of the claims.

What is claimed is:

1. In a dump body mechanism having a tiltable dump body and having means including a hydraulic cylinder for raising and lowering the body, there being a hydraulic circuit for said cylinder including an hydraulic pump and a return line, and there being a valve in said circuit for controlling the flow of hydraulic fluid into and out of said hydraulic cylinder, said valve including a housing and shiftable control member having a raise position in which hydraulic fluid is routed from said pump to said hydraulic cylinder to operate the cylinder to raise the dump body, and having a neutral position in which hydraulic fluid is bypassed around said hydraulic cylinder to hold the body in a raised position, there being means in said circuit permitting said raising and the holding in raised position, and said shiftable control member having a lower position in which hyraulic fluid is routed from said hydraulic cylinder to said return line to operate said hydraulic cylinder to lower the dump body, there being means for selective shifting of said control member, and there being a flexible force transmitting member connected between said tiltable dump body and said movable valve control member to automatically shift the valve control member from its raise position to its neutral position when said dump body approaches its uppermost position, the improvement comprising relatively movable means connected to said valve control member said valve housing, and to said force transmitting member for preventing an inadvertent pull on said force transmitting member from being transmitted to the valve control member when the latter is in neutral position to prevent accidental lowering of said dump body.

2. The dump body mechanism defined in claim 1 wherein said movable means for preventing an inadvertent pull on said force transmitting member from being transmitted to said valve control member includes at least one additional flexible force transmitting member having one end fixed to said valve housing and having its other end connected to the first mentioned flexible force transmitting member at a location spaced from the housing, said additional force transmitting member being of such length as to be pulled taut when said valve control member is shifted to its neutral position, thereby preventing forces applied to the first mentioned flexible force transmitting member from being transmitted to said valve control member.

3. The dump body mechanism defined in claim 2 in which there are two additional flexible force transmitting members one on each side of the adjacent portion of the first mentioned flexible force transmitting member.

4. The dump body mechanism defined in claim 1 wherein said valve control member is a spool movable in said housing and having an end, and wherein said movable means for preventing an inadvertent pull on said force transmitting member from being transmitted to said spool includes a slide member mounted for limited slideable movement axially of said spool, one end of said force transmitting member being connected to said slide member, there being means including a lost motion connection between said slide member and spool to provide for deliberate movement of the spool from neutral to lower when desired, and there being cooperating stop means between said slide member and valve housing for preventing movement of said slide member in response to an inadvertent pull on said force transmitting member when said spool is in its neutral position.

5. The dump body mechanism defined in claim 6 wherein said slide member is a sleeve slideably mounted over the end of said valve spool, one end of said force transmitting means being connected to said sleeve, and wherein said lost motion connection is between said sleeve and said valve spool, and wherein the cooperating stop means is between said sleeve and the valve housing.

6. The dump body mechanism defined in claim 5 wherein said sleeve is slideably mounted within a valve housing hub, and wherein said stop means comprises a stop ring fixed to the outside of said sleeve and a shoulder in said hub positioned to be engaged by said stop ring when said valve spool is moved to its neutral position.

7. The dump body mechanism defined in claim 6 wherein said lost motion connection comprises a slot in said slide having opposite ends, and a pin projecting from the valve spool and slideable in said slot to be engaged with one or the other of said ends.

8. The dump body mechanism defined in claim 4 in which there is spring means positioned between said spool and slide member for automatically returning said valve spool from its lower position to its neutral position when pressure on said valve spool is released.

9. The dump body mechanism defined in claim 5 wherein one end of said sleeve is closed, and further comprising a compression spring positioned between the closed end of said sleeve and the adjacent end of said valve spool to automatically return said valve spool from its lower position to its neutral position when pressure on said valve spool is released.

* * * * *